(12) United States Patent
Komorowski et al.

(10) Patent No.: US 11,780,490 B2
(45) Date of Patent: Oct. 10, 2023

(54) GEARBOX ASSEMBLY FOR AN ELECTRIC POWER STEERING APPARATUS

(71) Applicant: ZF Steering Systems Poland Sp. Z.o.o., Czechowice-Dziedzice (PL)

(72) Inventors: Marcin Komorowski, Bielsko-Biala (PL); Artur Wojtalik, Katowice (PL); Pawel Ponikiewski, Pewel Mala (PL)

(73) Assignee: ZF Steering Systems Poland Sp. Z.o.o., Czechowic-Dziedzice (PL)

( * ) Notice: Subject to any disclaimer, the term of this patent is extended or adjusted under 35 U.S.C. 154(b) by 0 days.

(21) Appl. No.: 17/857,218

(22) Filed: Jul. 5, 2022

(65) Prior Publication Data

US 2023/0025501 A1    Jan. 26, 2023

(30) Foreign Application Priority Data

Jul. 23, 2021   (EP) ..................................... 21461571
Aug. 23, 2021  (EP) ..................................... 2112066.2

(51) Int. Cl.
*B62D 5/04* (2006.01)
*F16H 55/24* (2006.01)
*F16H 57/021* (2012.01)

(52) U.S. Cl.
CPC .......... *B62D 5/0454* (2013.01); *B62D 5/0403* (2013.01); *F16H 55/24* (2013.01); *F16H 57/021* (2013.01); *F16H 2057/0213* (2013.01)

(58) Field of Classification Search
CPC ..... B62D 5/0454; B62D 5/0403; F16H 55/24; F16H 57/021; F16H 2057/0213
See application file for complete search history.

(56) References Cited

U.S. PATENT DOCUMENTS 11,498,610 B2 * 11/2022 Doornbos ................ F16D 3/54
2007/0125193 A1 * 6/2007 Augustine ............ F16F 15/022
74/416
(Continued)

FOREIGN PATENT DOCUMENTS

DE   112017004439 T5   6/2019
EP       0534926 A2    3/1993
(Continued)

*Primary Examiner* — Zakaria Elahmadi
(74) *Attorney, Agent, or Firm* — Kristin L. Murphy

(57) ABSTRACT

A gearbox assembly for power take off from an electric motor of an electric power assisted steering apparatus comprising a gearbox housing which houses a worm shaft and a gear wheel, is disclosed. The worm shaft incorporates one or more external helical worm teeth. A main bearing assembly supports the worm shaft at an end closest to the motor. A tail bearing assembly supports the worm shaft at an end furthest from the motor, in which at least the tail bearing assembly is free to move relative to the housing through a limited range of motion that enables the worm shaft to move radially away from the axis of the wheel gear. The gearbox assembly further comprises a flexible coupler which connects the worm shaft at the main bearing end to a power take off from the motor so as to transfer torque from the motor to the worm shaft. The flexible coupler comprises a first hub part providing a connection to the worm shaft, a second hub part providing a connection to the power take off from the motor, and a flexible membrane that connects the first hub part to the second hub part. The flexible membrane provides a primary path for the transfer of torque from the first hub part to the second hub part.

18 Claims, 8 Drawing Sheets

(56) References Cited

U.S. PATENT DOCUMENTS

| | | | | |
|---|---|---|---|---|
| 2009/0314114 A1* | 12/2009 | Grasberg | ............... | F16H 55/24 |
| | | | | 74/409 |
| 2010/0140011 A1* | 6/2010 | Wilkes | ................ | B62D 5/0409 |
| | | | | 180/444 |
| 2018/0202538 A1* | 7/2018 | Wilson-Jones | ....... | F16H 57/022 |
| 2021/0122407 A1* | 4/2021 | Wojtalik | .............. | F16H 57/039 |
| 2023/0045274 A1* | 2/2023 | Doornbos | ................ | F16H 1/16 |

FOREIGN PATENT DOCUMENTS

| | | | | |
|---|---|---|---|---|
| EP | 2532908 A1 * | 12/2012 | .............. | F16D 3/04 |
| EP | 2565480 A1 | 3/2013 | | |
| WO | WO-2008053226 A1 * | 5/2008 | ........... | B62D 5/0409 |

\* cited by examiner

GEARBOX ASSEMBLY FOR AN ELECTRIC POWER STEERING APPARATUS

CROSS-REFERENCE TO RELATED APPLICATION

This application claims priority to European Patent Application No. 21461571.8, filed Jul. 23, 2021 and GB Patent Application No. 2112066.2, filed Aug. 23, 2021, the disclosure of which is incorporated herein by reference in its entirety.

TECHNICAL FIELD

This disclosure relates to gearbox assemblies for electric power steering apparatus of the worm and wheel type.

BACKGROUND

Electric power steering systems use an electric motor to produce an assistance torque that is applied to a rotating part of the steering system. In a conventional arrangement, this torque assists the driver in turning the wheel. Because motors work best at relatively high speeds and because compact motors produce relatively low torques, a connection between the output of the motor and the steering column is usually through a reduction gearbox.

The most widely used type of electric power assisted steering reduction gearboxes are of a relatively simple worm and gear configuration like that shown in FIG. 1 of the accompanying drawings. The gearbox assembly typically comprises a gearbox housing 100 which houses a worm shaft 101 and a gear wheel 102. The worm shaft is connected to the output of an electric motor 103 (shown at the far left). The motor 103 may be secured to an end face of the housing or even located within the housing. The worm shaft 101 is supported by two bearing assemblies; one either side of the region where the worm gear of the worm shaft engages the wheel gear. The first bearing assembly in this description is called a main bearing assembly 104 and is located at an end closest to the motor 103. The second bearing assembly is referred to as a tail bearing assembly 105 and is located at an end furthest from the motor, both bearing assemblies typically comprising bearing elements supported within an inner bearing race that is threaded onto the worm shaft and an outer bearing race that is secured to the housing of the gearbox assembly. The function of the bearing assemblies is to allow the worm shaft to rotate while to a certain degree limiting axial and radial movement. The gear wheel 102 is connected to an output shaft 106 of the gearbox and located so that teeth of the gear wheel engage teeth of the worm shaft.

It is known that the speed reduction gearboxes used in electrical power-assisted Steering (EPS) apparatuses are prone to rattle due to external torsional vibrations acting at their output shafts. These vibrations originate at the road wheels due to surface roughness or unbalanced wheels. Alternatively, mechanical noise can arise from sudden torque reversals applied at the steering wheel by the driver which cause the teeth of the wheel gear to apply a sudden force onto the worm shaft teeth. The main rattle sites in a worm and wheel gearbox are at the engagement of the worm and gear teeth and at the main bearing, closest to the motor, which axially locates the worm shaft.

When there is a zero or low level of transmitted gearwheel torque, rattle between the gear teeth can be suppressed by biasing the worm shaft into mesh with the gearwheel by an external force such as the anti-rattle spring 107 so that the teeth are held in so-called "dual-flank" contact. i.e., both sides of the engaged teeth on the worm shaft are simultaneously in contact with the adjoining tooth flanks on the gear wheel. There is no rotational free play between the gearwheel and the worm shaft in this situation. The spring pushes (downwards in FIG. 1) on the outer race of the worm shaft tail bearing.

To facilitate this movement, the connection between the worm shaft and the motor must allow include a certain amount of freedom of movement. As shown in FIG. 1, and better visible in the exploded partial view of FIG. 2, that can be achieved by rounding the tip 108 of an output shaft of the motor and locating this within a complimentary socket in a rigid coupler that is connected to the worm shaft. In the prior art such as the arrangement disclosed in the applicant's earlier patent application PCT/GB017/052892 from which the image of FIG. 1 is taken the rigid coupler has two separate parts, one part 109 fixed to the motor shaft and the other part 110 to the worm shaft. Each of these two parts is provided with teeth that interlock the two parts to provide a path for the flow of torque across the coupler.

A difficulty with such a known two-part coupler presents during assembly, where it is necessary to take care to align the two parts of the coupler correctly to prevent a clash between the lugs on each part that prevent rotation. Because the two parts are rigid a misalignment may damage these lugs or prevent the parts being pushed fully together, which at best slows done assembly and at worse requires the part to be replaced.

SUMMARY

What is needed is to ameliorate problems which present during assembly of prior art gearbox assemblies of the kind described above.

According to a first aspect the disclosure provides a gearbox assembly for power take off from an electric motor of an electric power assisted steering apparatus comprising:

a gearbox housing which houses a worm shaft and a gear wheel, the worm shaft incorporating one or more external helical worm teeth, a main bearing assembly that supports the worm shaft at an end closest to the motor, a tail bearing assembly that supports the worm shaft at an end furthest from the motor, in which at least the tail bearing assembly is free to move relative to the housing through a limited range of motion that enables the worm shaft to move radially away from the axis of the wheel gear, and further comprising a flexible coupler which connects the worm shaft at the main bearing end to a power take off from the motor to transfer torque from the motor to the worm shaft, characterized in that the flexible coupler comprises a first hub part providing an connection to the worm shaft, a second hub part providing a connection to the power take off from the motor, and a flexible membrane that connects the first hub part to the second hub part, the flexible membrane providing a primary path for the transfer of torque from the first hub part to the second hub part.

The membrane may substantially prevent relative angular movement between the two hub parts during use of the gearbox assembly by having a high resistance to deformation under torsional loads applied between the two hubs and may substantially permit relative axial and radial movement between the two hubs over a limited range of displacement.

The membrane may enable a relative axial movement of the first and second hub parts during use of up 2 mm or perhaps 3 mm or more, and may permit a radial movement of at least 0.5 mm or at least 1 mm or at least 2 mm. It may permit substantially no rotational movement up to a torsional load of a few tens of Nm applied between the two hub parts such that the driver of a vehicle using the steering does not feel any torsional play or hysteresis due to the membrane.

The provision of the coupler with the flexible membrane allows for a degree of self-alignment to be obtained during assembly for radial and axial offset of the Worm shaft and motor power take off, in one exemplary arrangement, overcoming a problem in the prior art of clashing when a coupler formed as two separate parts is provided. The membrane provides the path for transferring torque across the coupler rather than the interlocking of teeth on two separate components.

The membrane may comprise a thin, disc shaped, undulating sheet of material connecting the first hub to the second hub.

The membrane may be configured such that an axial or a radial load cause parts of the membrane to deform by bending with little shear of the membrane, whereas torsional loads result primarily in a shear of membrane. By providing a thin membrane of material that is easily bent but hard to deform in shear the required torsional, radial, and axial load behaviour can be achieved. A plastic material or metal alloy or a composite material may be employed to achieve the desired behaviour. However, in one exemplary arrangement, the coupler comprises a moulded plastic component or a glass fibre material such as PA6 30GF or similar.

The first hub part, second hub part and the membrane may be formed as a unitary component. The unitary component may comprise a flexible composite material. The hub parts and the membrane may comprise a single part such as a one-piece moulding.

The first hub part and the second hub part may each be relatively inflexible. They may have thicker walls than the membrane to provide this property but otherwise be of the same material as the membrane.

The first hub part and second hub part may be generally cylindrical and share a common axis of rotation, one being of larger diameter than the other. They may of course move out of this alignment when a radial load is applied the hub parts.

The membrane may extend radially between the two hub parts, and may comprise a set of two or more cylindrical portions each of different diameter that are each connected on one end to an adjacent end of an adjacent cylindrical portion through a radially extending flexible ring like portion, and connected on the other end of either an adjacent end of an adjacent cylinder or to one of the hubs through a radially extending ring like portion to provide a serpentine cross sectional shape to the membrane.

Each of the cylindrical portions of the membrane and the two hubs may be arranged around a common axis so that when viewed along the axis of the worm shaft the hubs and cylindrical portions are concentric. Two or more of the cylindrical portions may physically be arranged concentrically but it is within the scope of the disclosure that some cylinders do not wholly or partially overlap at least one other cylinder but are offset axially.

The cylindrical portions may provide the primary source of radial flexibility of the membrane and the ring like portions may provide the primary source of axial flexibility of the membrane.

Alternatively, the ring like portions may be the primary source of both radial and axial flexibility of the membrane.

Each ring like portion may comprise one half of a torus formed by rotating a semi-circular form around the axis of rotation of the ring thereby having a c-shaped cross section when viewed in cross section along a line radially extending from the centre of rotation of the ring, with the direction in which the c-shape faces alternating from one ring to the next when traversing any linear path defined along a surface of the membrane that interconnecting the two hubs. This defines an undulating, serpentine, surface when viewed in cross section.

By alternating in direction, the cylinder and rings will define a concentric pattern of alternating ridges and furrows when viewed along the axis of rotation of the coupler. This shape combined with considered selection of the materials and the thickness of the membrane allow the required torsional, radial, and axial flexibility of the coupler to be tuned for a given application.

The first hub part may be generally cylindrical and include a set of splines for connecting to a complimentary set of splines of the worm shaft.

The second hub part may by generally cylindrical and include a set of splines for connecting to a complimentary set of splines of the motor power take off.

The splines of at least one hub part and corresponding splines of the worm shaft of motor take off may be relatively fine and may be configured to self-align if they are not self-aligned during initial assembly.

The first hub part may have a smaller external diameter than the second hub part.

The coupler may include a metal collar that fits snugly onto the first hub on the opposite side of the cylinder to the spline to prevent distortion of the splined portion of the hub part.

Similarly, the coupler may include a metal collar that fits snugly onto the second hub part on the opposite side of the cylinder to the spline to prevent distortion of the splined portion of the hub.

The or each collar may be a split collar which does not extend all the way around the hub to provide a degree of expansion to the diameter of the collar when under load. The main function of these collar is to hold, with elastic susceptibility, the spline toothing connection in place.

Where a split is provided in the collar a corresponding portion of the hub in that region may be omitted to form a slit. This ensures elastic susceptibility of that area of the hub.

The splines may be provided around an outward facing, or an inward facing, wall of the cylindrical part of each hub.

The gearbox assembly may include a spring, such as a coil spring, the acts between a hub of the coupler and the motor power take off, or between a hub of the coupler and the worm shaft, to provide an axial preloading of the worm shaft.

The first hub part may define a seat for an end of the coil spring. This may be provided on the side of the first hub facing the Worm shaft or on the opposing side.

In one exemplary arrangement, the first hub may include a set of internal splines that engage with external splines on the worm shaft, and the second hub may include a set of internal splines that engage with a part of the motor power take off, and the spring may act between the power take off and the first hub on an opposite side of the first hub to the worm shaft.

In an alternative exemplary arrangement the first hub part may include a set of internal splines that engage and oversized portion of the worm shaft and the second hub may include a set of internal splines that engage with a splined portion of the power take off, the spring being located within a recess formed in the end of the worm shaft and acting between the worm shaft and the second hub.

BRIEF DESCRIPTION OF DRAWINGS

There will now be described, by way of example only, two exemplary arrangements of a gearbox assembly that fall within the scope of the present disclosure with reference to and as illustrated in the accompanying drawings of which.

DETAILED DESCRIPTION

Figure 1:
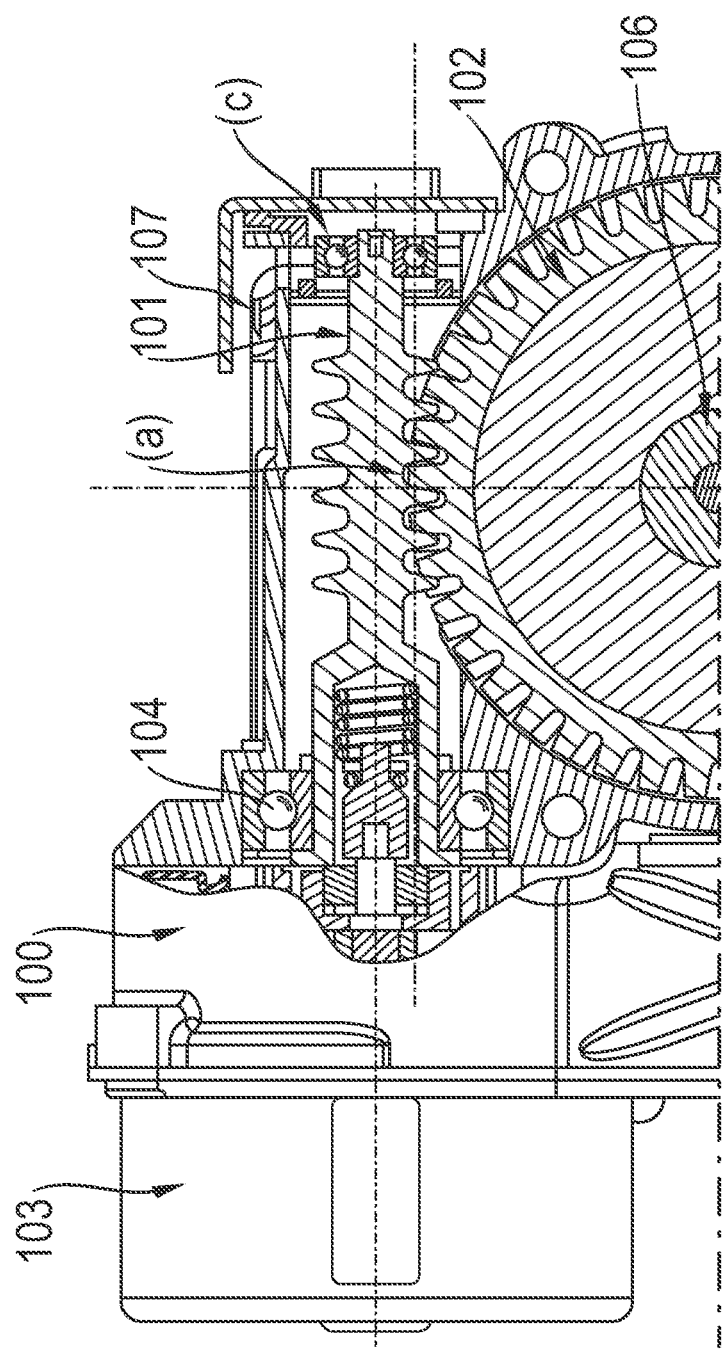
FIG. 1 is cross section view of a prior art gearbox assembly for an electric power assisted steering system.
Figure 2:
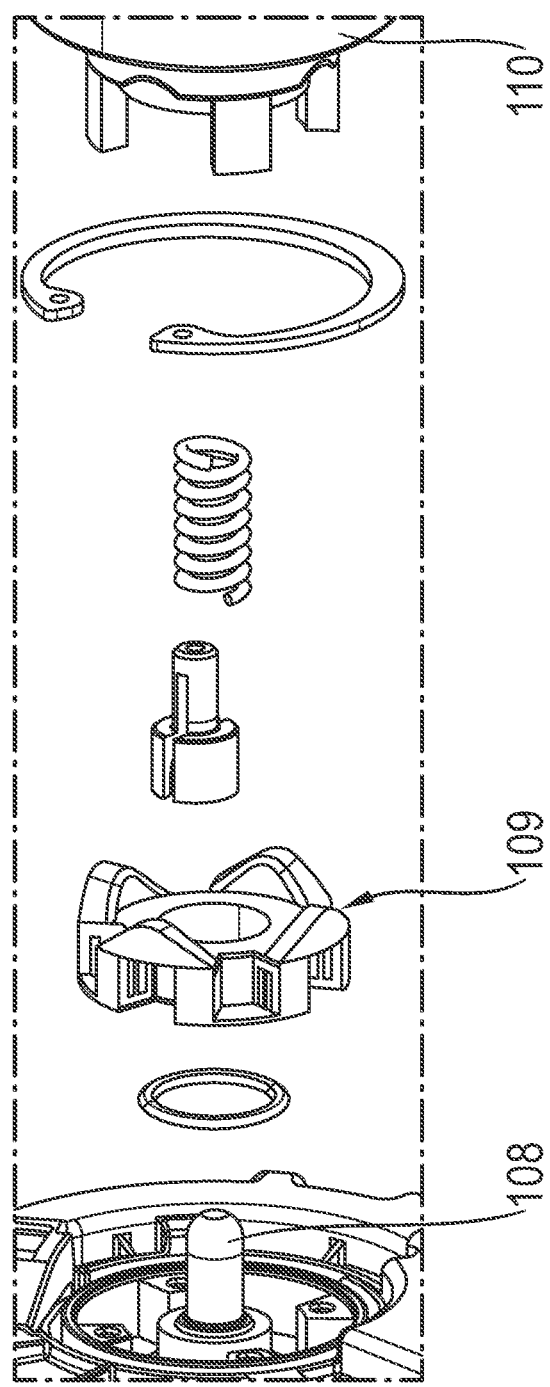
FIG. 2 is an enlarged view of the coupler of the gearbox assembly of FIG. 1.
Figure 3:
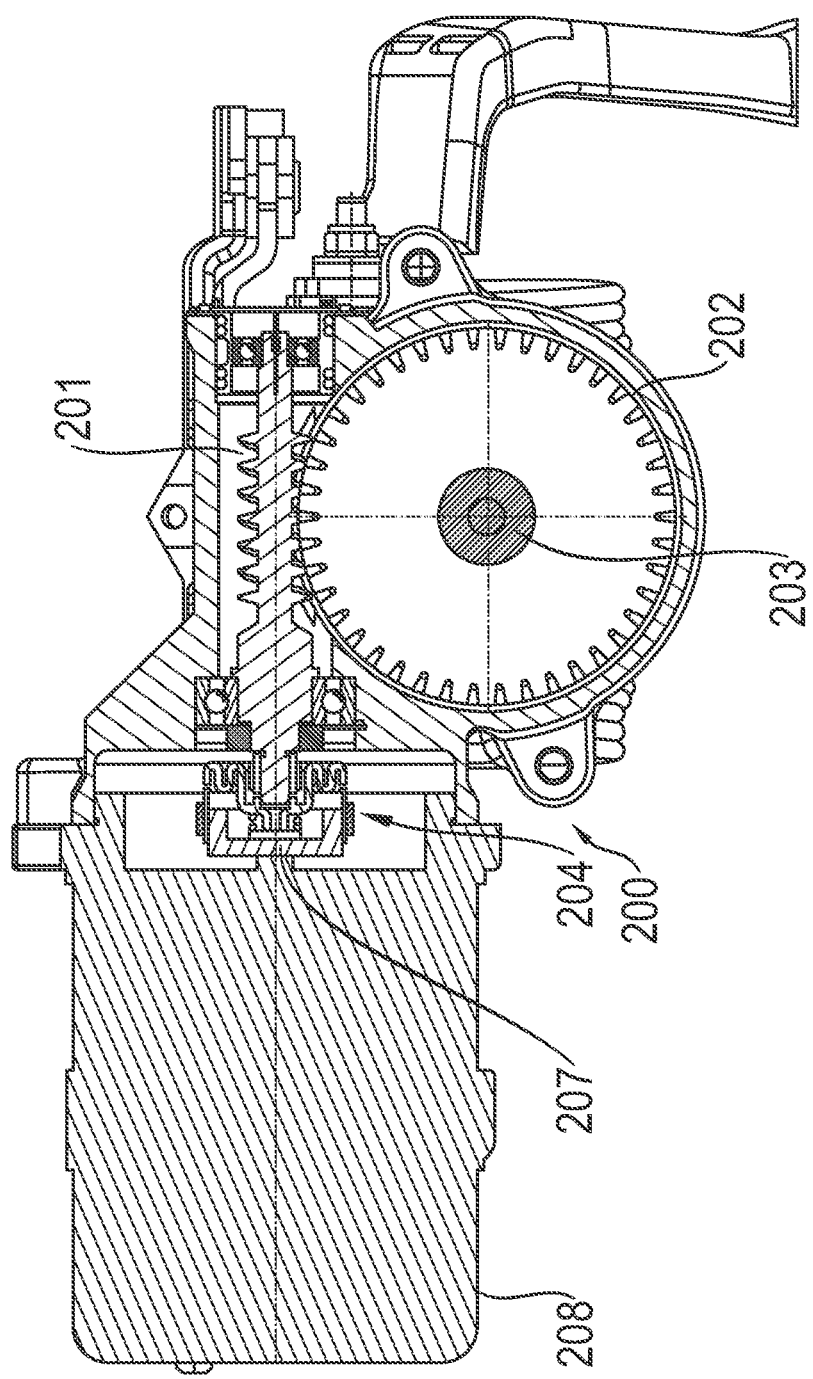
FIG. 3 is a cross section view like that of FIG. 1 of a first exemplary arrangement of a gearbox according to the present disclosure.
Figure 4:
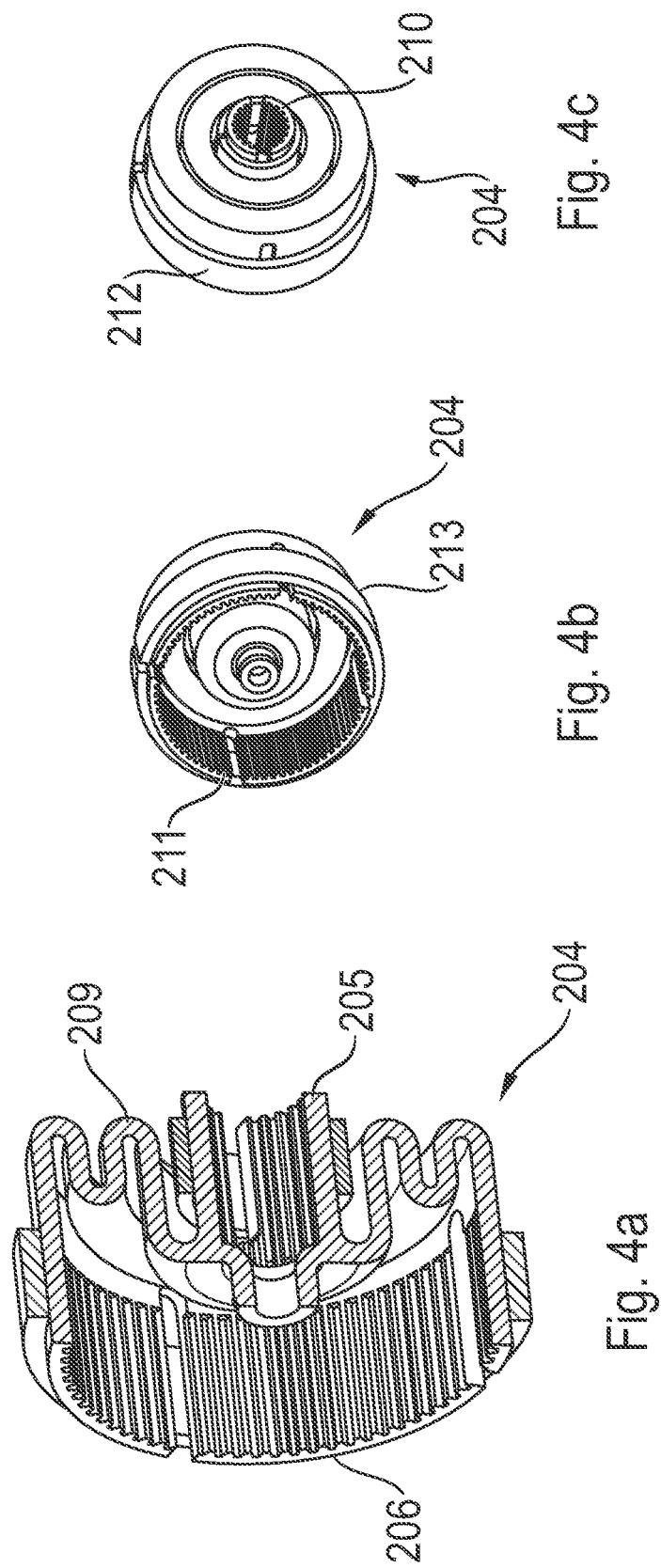
FIGS. 4a, 4b and 4c are views of a coupler of the first exemplary arrangement of a gearbox assembly according to an aspect of the disclosure.

A first exemplary arrangement of the disclosure is shown in FIGS. 3 to 6. The gearbox assembly 200 provides a geared reduction in the output of an electric motor of the steering apparatus, allowing torque generated by the motor to be transferred to the steering column or rack (or other part of the steering system), the torque assisting the driver to turn the wheel or providing the principle source of steering torque.

The gearbox assembly 200 comprises a gearbox housing which houses a worm shaft 201 incorporating one or more external helical worm teeth, and a worm wheel 202 which is carried by an output shaft 203. A gear ratio of the gearbox assembly is set by a relative shape and number of teeth of the worm shaft and the wheel, each rotation of the Worm shaft causing the wheel to advance by a set number of teeth corresponding to a fraction of a whole revolution of the wheel.

A main bearing assembly 204 supports the worm shaft at an end closest to the motor and a tail bearing assembly 205 supports the worm shaft at an end furthest from the motor, the bearings enabling the shaft to rotate about its long axis. The tail bearing assembly is free to move relative to the housing through a limited range of motion that enables the worm shaft to move radially away from an axis of the wheel gear.

The worm shaft 201 is connected to a power take off from an electric motor 207 through a flexible coupler 204. The function of the coupler it to transfer torque from the motor to the worm shaft while enabling some relative movement between the worm shaft and a power take off of the motor 208.

The flexible coupler 204 can best be seen in FIGS. 4a to 4c of the drawings. The flexible coupler 204 comprises a one piece moulding that defines a first hub part 205 providing a connection to the worm shaft 201, a second hub part 206 providing a connection to the power take off 207 from the motor 208, and a flexible membrane 209 that connects the first hub part to the second hub part. The first and second hub parts 205,206 have relatively thick walls and are rigid, the membrane is thin walled and much more flexible. The flexible membrane 209 provides a primary path for the transfer of torque from the first hub part to the second hub part. As such this membrane carries the torque from the motor power take off across the coupler to the worm shaft.

The first hub part 205 is generally annular in shape and has a set of internal splines 210 that engage with corresponding splines on the end of the worm shaft that faces the motor. The second hub part 206 is also generally annular and has a larger diameter than the first hub part 205. This also has a set of internal splines 211 that engage a set of corresponding splines on the power take off from the motor.

Both hub parts are surrounded by a respective metal ring 212, 213 that prevents the hub part from expanding radially when fitted to the corresponding power take off or worm shaft, preventing the splines from jumping out of engagement. Each metal ring has a split so that it does not form a complete circle, allowing a small degree of radial compliance to the ring so it can act as a spring to press the splines home.

The two hub parts 205, 206 are connected by the membrane 209 that comprises a set of three half torus portions of differing diameter, and edge of each half torus being connected to an edge of another torus by a cylindrical portion of membrane. The connections give the membrane an undulating surface when traversing along any radial line connecting the first and second hub parts. These undulations give the membrane a high flexibility in respect of axial and radial loads applied across the membrane, but a high resistance to torsional deformation. This is because radial and axial loads cause parts of the membrane to bend but torsional loads require parts of the membrane to stretch of compress in their plane.

Figure 5:
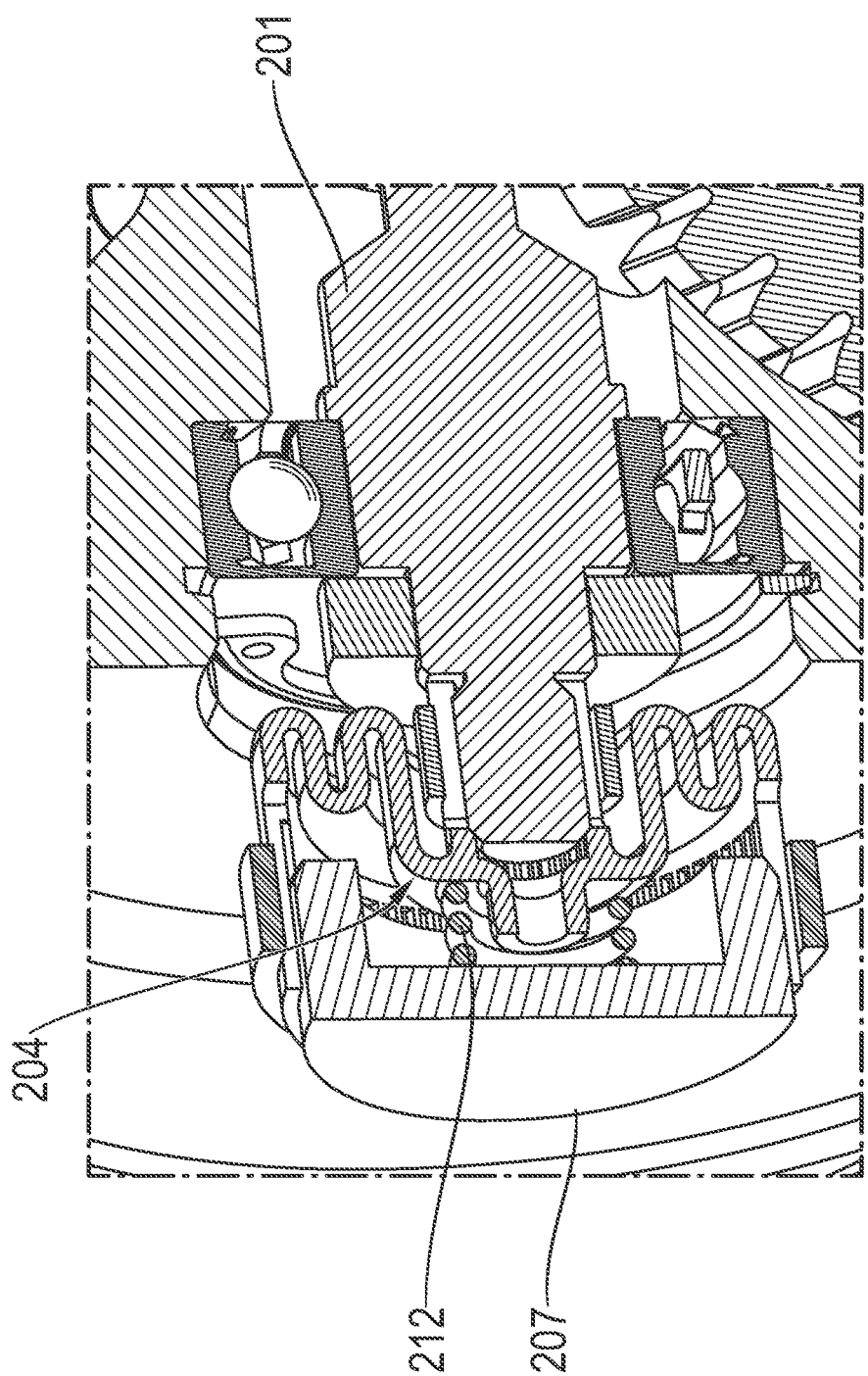
FIG. 5 is a view in cross section of the coupler in situ in the gearbox assembly of the first exemplary arrangement.

As shown in FIG. 4(b) and FIG. 5, the first hub part 205 has an annular protrusion on a side facing away from the worm shaft. This provides a seat of a coil spring 212 that acts between the first hub part and the power take off, providing some axial preload to the connection between the motor and worm shaft. The spring 212 is optional and may be omitted in some arrangements that fall within the scope of the disclosure.

Figure 6:
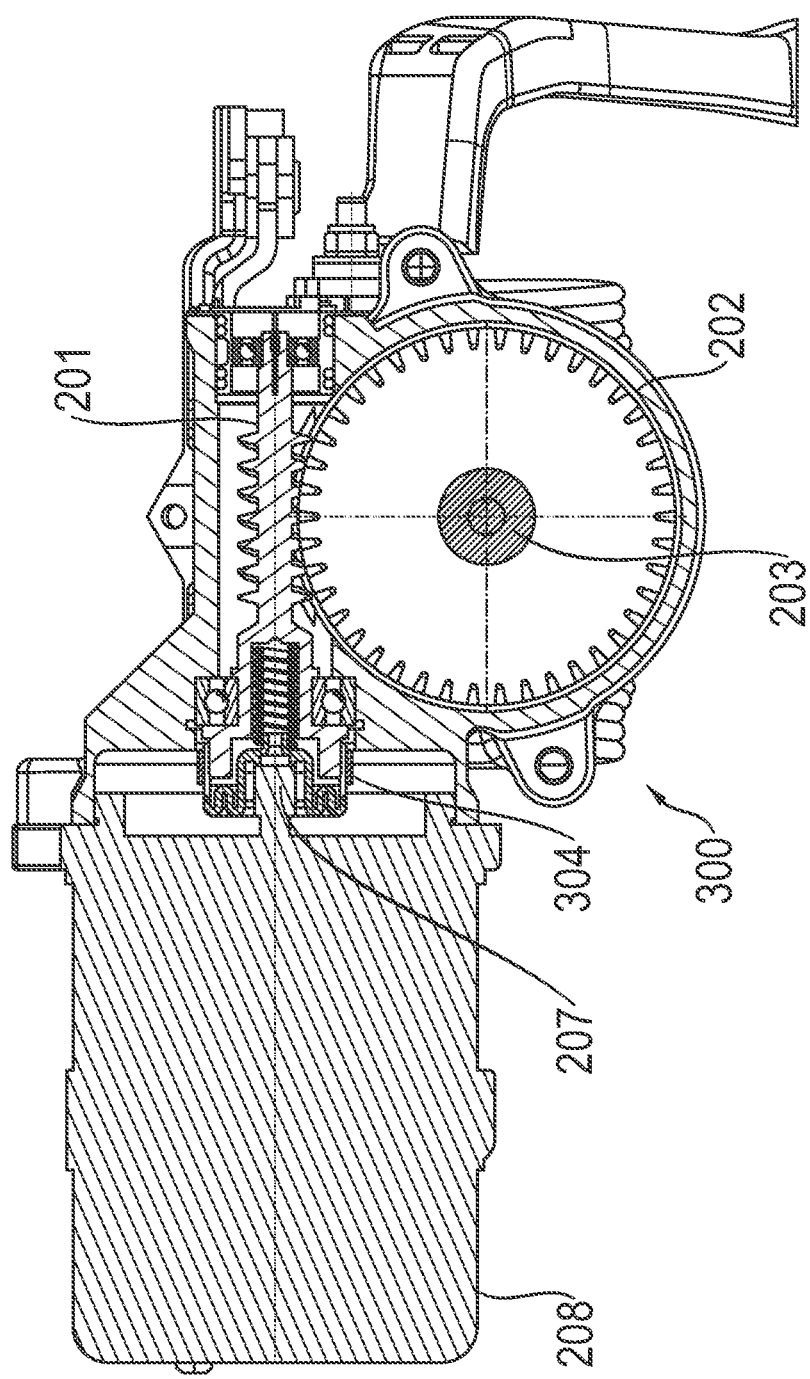
FIG. 6 is a cross section view like that of FIG. 1 of a second exemplary arrangement of a gearbox according to the present disclosure.
Figure 7C:
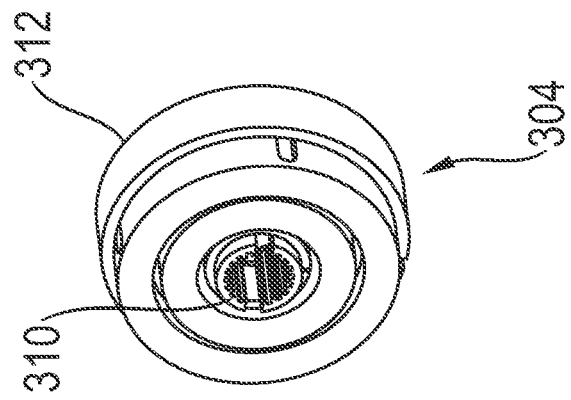
FIGS. 7a, 7b and 7c are views of a coupler of the second exemplary arrangement of a gearbox assembly according to an aspect of the disclosure.
Figure 7B:
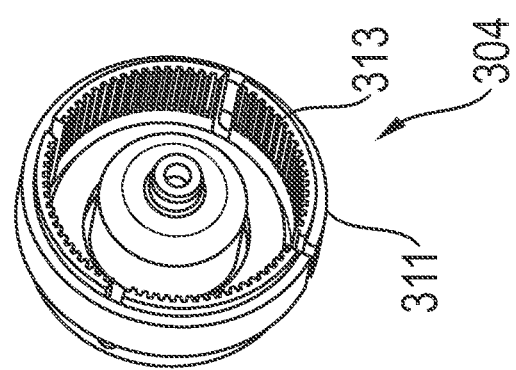
Figure 7A:
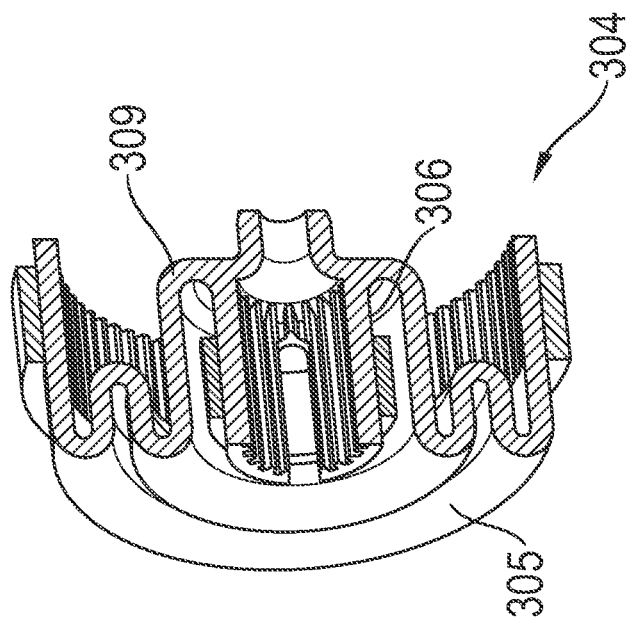
Figure 8:
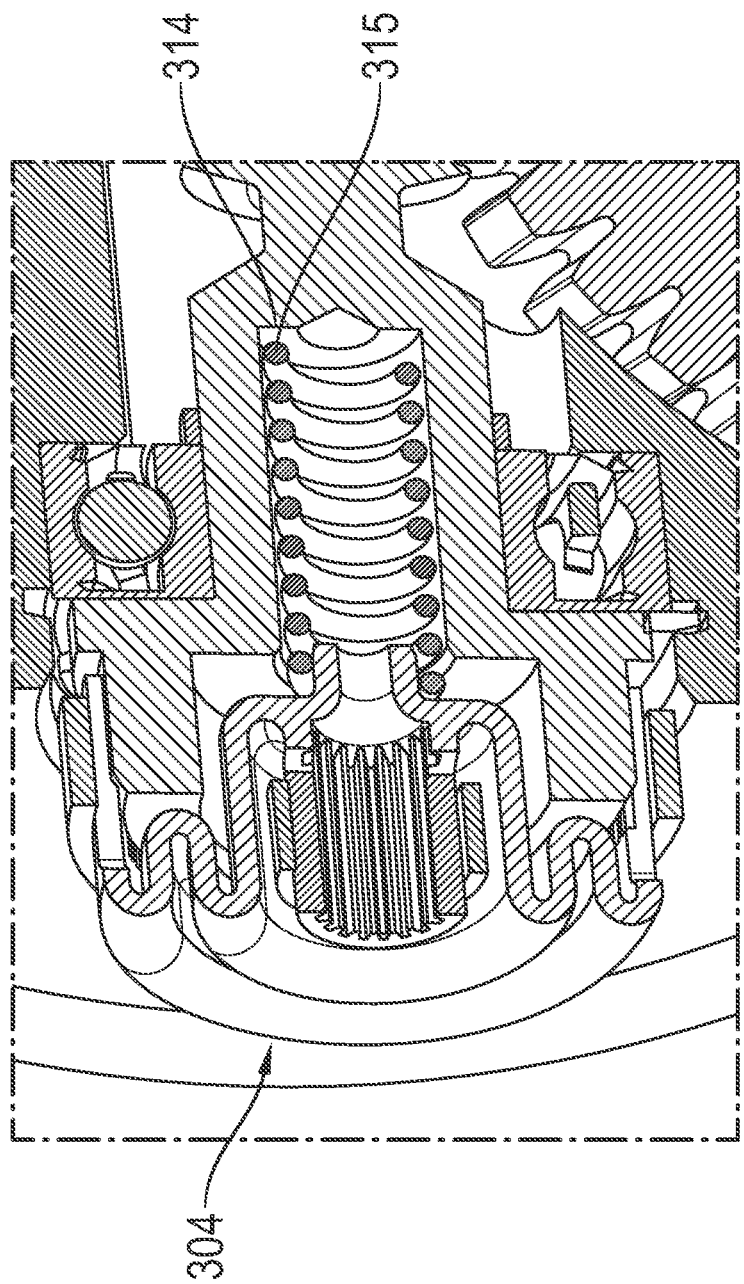
FIG. 8 is an enlarged view in cross section of the coupler in situ in the gearbox assembly of the second exemplary arrangement.

FIGS. 6 to 8 illustrate a second exemplary arrangement of a gearbox assembly according to an aspect of the disclosure. The gearbox assembly 300 is very similar to that of the first exemplary arrangement and like components have been identified with like reference numerals for clarity.

The second exemplary arrangement differs from the first in the shape of the flexible coupler 304 and in how this is connected to the end of the worm shaft 201 and power take off 207.

Like the first exemplary arrangement, the coupler 304 comprises a one piece moulding that defines a first hub part 305 providing an connection to the worm shaft, a second hub part 306 providing a connection to the power take off from the motor, and a flexible membrane 309 that connects the first hub to the second hub. The first and second hub parts 305,306 have relatively thick walls and are rigid, the membrane 309 is thin walled and much more flexible. The flexible membrane provides a primary path for the transfer of torque from the first hub part to the second hub part. As such this membrane carries the torque from the motor power take off across the coupler to the worm shaft.

The first hub part 305 is generally annular in shape and has a set of internal splines that engage with corresponding splines on an enlarged end portion of the worm shaft that faces the motor. The second hub part 306 is also generally annular but in this exemplary arrangement it has a diameter that is smaller than the diameter of the first hub part. This also has a set of internal splines 310 that engage a set of corresponding splines on the power take off from the motor. The second hub part 306 is arranged concentrically within the first hub part.

Both hub parts are surrounded by a respective metal ring 311, 312 that prevents the hub part from expanding radially when fitted to the corresponding power take off or worm shaft, preventing the splines from jumping out of engagement. Each metal ring has a split so that it does not form a complete circle, allowing a small degree of radial compliance to the ring so it can act as a spring to press the splines home.

The flexible membrane 309 that connects the two hub parts is like that the of the first exemplary arrangement in its shape and construction. It comprises a set of three half torus portions of differing diameter, and edge of each half torus being connected to an edge of another torus by a cylindrical portion of membrane. The connections give the membrane an undulating surface when traversing along any radial line connecting the first and second hub parts.

Because the first hub part 305 has a relatively large diameter, it can connect to a corresponding oversized end part of the worm shaft as shown in FIG. 8. This provides room for a recess 314 in the end of the worm shaft that accommodates a coil spring 315. The coil spring acts between the base of the recess and the side of the second hub part that faces away from the motor. The spring therefore biases the worm shaft away from the motor power take off, and in doing so presses the second hub part into engagement with the power take off. As with the first exemplary arrangement, the provision of the spring is optional in some arrangements within the scope of the disclosure.

The invention claimed is:

1. A gearbox assembly for power take off from an electric motor of an electric power assisted steering apparatus comprising:
a gearbox housing which houses a worm shaft and a gear wheel,
the worm shaft incorporating one or more external helical worm teeth,
a main bearing assembly that supports the worm shaft at an end closest to the motor,
a tail bearing assembly that supports the worm shaft at an end furthest from the motor,
in which at least the tail bearing assembly is free to move relative to the housing through a limited range of motion that enables the worm shaft to move radially away from an axis of the wheel gear,
and further comprising a flexible coupler which connects the worm shaft at the main bearing end to a power take off from the motor so as to transfer torque from the motor to the worm shaft,
wherein the flexible coupler comprises a first hub part providing a connection to the worm shaft, a second hub part providing a connection to the power take off from the motor, and a flexible membrane that connects the first hub part to the second hub part, the flexible membrane providing a primary path for the transfer of torque from the first hub part to the second hub part,
wherein the first hub part and second hub part are generally cylindrical and share a common axis of rotation, one of the first and second hub parts being of larger diameter than the other and in which the membrane extends radially between the first and second hub parts.

2. A gearbox assembly according to claim 1 in which the membrane substantially prevents relative angular movement between the first and second hub parts during use of the gearbox assembly by having a high resistance to deformation under torsional loads applied between the first and second hubs and substantially permit relative axial and radial movement between the first and second hubs over a limited range of displacement.

3. A gearbox assembly according to claim 1 in which the membrane comprises a thin, disc shaped, undulating sheet of material connecting the first hub to the second hub.

4. A gearbox assembly according to claim 1, in which the membrane is configured such that an axial or a radial load cause parts of the membrane to deform by bending with little shear of the membrane, whereas torsional loads result primarily in a shear of membrane.

5. A gearbox assembly according to claim 1, in which the first hub part, second hub part and the membrane are formed as a unitary component.

6. A gearbox assembly according to claim 1 in which the membrane comprises a set of two or more cylindrical portions each of different diameter that are each connected on one end to an adjacent end of an adjacent cylindrical portion through a radially extending flexible ring like portion, and connected on the other end of either an adjacent end of an adjacent cylinder or to one of the first and second hubs through a radially extending ring like portion to provide a serpentine cross sectional shape to the membrane, each of the cylindrical portions of the membrane and the two hubs being arranged around a common axis so that when viewed along the axis of the worm shaft the first and second hubs and cylindrical portions are concentric.

7. A gearbox assembly according to claim 1 in which the coupler includes a metal collar that fits snugly onto the first hub on the opposite side of the cylinder to the spline to prevent distortion of the splined portion of the hub part.

8. A gearbox assembly according to claim 1 in which the coupler includes a metal collar that fits snugly onto the second hub part on the opposite side of the cylinder to the spline to prevent distortion of the splined portion of the hub.

9. A gearbox assembly according to claim 2 in which the membrane comprises a thin, disc shaped, undulating sheet of material connecting the first hub to the second hub.

10. A gearbox assembly according to claim 9, in which the membrane is configured such that an axial or a radial load cause parts of the membrane to deform by bending with little shear of the membrane, whereas torsional loads result primarily in a shear of membrane.

11. A gearbox assembly according to claim 10, in which the first hub part, second hub part and the membrane are formed as a unitary component.

12. A gearbox assembly according to claim 1, in which the first hub part and second hub part are generally cylindrical and share a common axis of rotation, one of the first and second hub parts being of larger diameter than the other and in which the membrane extends radially between the first and second hub parts.

13. A gearbox assembly according to claim 6 in which the coupler includes a metal collar that fits snugly onto the first hub on the opposite side of the cylinder to the spline to prevent distortion of the splined portion of the hub part.

14. A gearbox assembly according to claim 6 in which the coupler includes a metal collar that fits snugly onto the second hub part on the opposite side of the cylinder to the spline to prevent distortion of the splined portion of the hub.

15. A gearbox assembly according to claim 7 in which the coupler includes a metal collar that fits snugly onto the second hub part on the opposite side of the cylinder to the spline to prevent distortion of the splined portion of the hub.

16. A gearbox assembly for power take off from an electric motor of an electric power assisted steering apparatus comprising:
    a gearbox housing which houses a worm shaft and a gear wheel,
    the worm shaft incorporating one or more external helical worm teeth,
    a main bearing assembly that supports the worm shaft at an end closest to the motor,
    a tail bearing assembly that supports the worm shaft at an end furthest from the motor,
    in which at least the tail bearing assembly is free to move relative to the housing through a limited range of motion that enables the worm shaft to move radially away from an axis of the wheel gear,
    and further comprising a flexible coupler which connects the worm shaft at the main bearing end to a power take off from the motor so as to transfer torque from the motor to the worm shaft,
    wherein the flexible coupler comprises a first hub part providing a connection to the worm shaft, a second hub part providing a connection to the power take off from the motor, and a flexible membrane that connects the first hub part to the second hub part, the flexible membrane providing a primary path for the transfer of torque from the first hub part to the second hub part,
    wherein the membrane comprises a thin, disc shaped, undulating sheet of material connecting the first hub to the second hub.

17. A gearbox assembly according to claim 16 in which the membrane substantially prevents relative angular movement between the first and second hub parts during use of the gearbox assembly by having a high resistance to deformation under torsional loads applied between the first and second hubs and substantially permit relative axial and radial movement between the first and second hubs over a limited range of displacement.

18. A gearbox assembly for power take off from an electric motor of an electric power assisted steering apparatus comprising:
    a gearbox housing which houses a worm shaft and a gear wheel,
    the worm shaft incorporating one or more external helical worm teeth,
    a main bearing assembly that supports the worm shaft at an end closest to the motor,
    a tail bearing assembly that supports the worm shaft at an end furthest from the motor,
    in which at least the tail bearing assembly is free to move relative to the housing through a limited range of motion that enables the worm shaft to move radially away from an axis of the wheel gear,
    and further comprising a flexible coupler which connects the worm shaft at the main bearing end to a power take off from the motor so as to transfer torque from the motor to the worm shaft,
    wherein the flexible coupler comprises a first hub part providing a connection to the worm shaft, a second hub part providing a connection to the power take off from the motor, and a flexible membrane that connects the first hub part to the second hub part, the flexible membrane providing a primary path for the transfer of torque from the first hub part to the second hub part,
    wherein the first hub part and second hub part are generally cylindrical and share a common axis of rotation, one of the first and second hub parts being of larger diameter than the other and in which the membrane extends radially between the first and second hub parts.

* * * * *